United States Patent [19]

Gumb et al.

[11] Patent Number: 4,594,478
[45] Date of Patent: Jun. 10, 1986

[54] TRANSMITTER ASSEMBLY FOR A TELEPHONE HANDSET

[75] Inventors: Beverley W. Gumb; Raymond C. Freeman, both of London; Alan C. Busche, Dorchester, all of Canada

[73] Assignee: Northern Telecom Limited, Montreal, Canada

[21] Appl. No.: 634,690

[22] Filed: Jul. 26, 1984

[30] Foreign Application Priority Data

Mar. 16, 1984 [CA] Canada .................................. 449775

[51] Int. Cl.$^4$ .............................................. H04B 1/03
[52] U.S. Cl. ................................... 179/103; 179/179; 179/100 R; 179/111 E; 181/160
[58] Field of Search ............ 179/111 E, 121 R, 100 R, 179/103, 178, 179, 180, 187; 181/158, 160

[56] References Cited

U.S. PATENT DOCUMENTS

| 4,263,484 | 4/1981 | Hisatsune et al. | 179/111 E |
| 4,281,222 | 7/1981 | Nakagawa et al. | 179/111 E |
| 4,291,202 | 9/1981 | Adams et al. | 179/103 |
| 4,292,561 | 9/1981 | Martin | 310/322 |
| 4,424,419 | 1/1984 | Chaput et al. | 179/111 E |
| 4,449,236 | 5/1984 | Walker, Jr. | 381/91 |

FOREIGN PATENT DOCUMENTS 1027951  5/1966  United Kingdom ............... 181/158

*Primary Examiner*—Gene Z. Rubinson
*Assistant Examiner*—R. Vaas
*Attorney, Agent, or Firm*—Sidney T. Jelly

[57] ABSTRACT

A transmitter assembly for a telephone set uses a commercially available cartridge electric transmitter, by modifying the response curve. This is obtained by an adapter housing the transmitter with a first volume defined between the end of the transmitter and the end of the bore in which the transmitter fits. At the end of the bore there is an end wall with a hole therethrough, the hole covered with a layer of acoustic resistance material. A second volume is formed on the other side of the end wall, by a hollow formation on the wall of the transmitter housing of the handset. A slot is formed in the transmitter housing wall within the formation. The first volume provides damping, the hole and acoustic resistance material provides dB limitation at a particular frequency (1000 Hz) and the second volume and slot provide resonance at a second frequency (3000 Hz).

5 Claims, 6 Drawing Figures

TRANSMITTER ASSEMBLY FOR A TELEPHONE HANDSET

This invention relates to a transmitter assembly for a telephone handset and is particularly concerned with such an assembly which uses a cartridge-type microphone, i.e. an electret microphone of non-specialized form and adapts it to telephone use.

Commercially available cartridge-type electret microphones as used in tape recorders and similar devices are very inexpensive but have a flat response curve. Electret microphones produced for telephone sets have not normally been of a cartridge-type and while having the desired response curve, are more expensive.

The present invention uses a commercially available cartridge microphone together with a specifically designed adaptor which physically adapts the cartridge microphone for mounting in the handset but also shapes or modifies the response curve so that it is acceptable for telephone use.

Broadly, a transmitter assembly as provided by the present invention comprises a cartridge microphone and an adaptor, the adaptor being a hollow moulding with the microphone having a snap-in insertion in the bore of the housing, the front surface of the microphone cartridge being positioned by a ledge extending around the bore. The adaptor has a closed end to the bore with a small hole in the closed end, the front surface of the microphone cartridge positioned a predetermined distance from the closed end. An acoustic resistance material is positioned over the small hole, the size of the hole and the acoustic resistance material determining the acoustic resistance of the assembly. The adaptor sits on a tubular projection on the inner surface of the transmitter housing of the handset, this forming a front volume which cooperates with slots in the front face of the transmitter housing to give the desired resonance frequency.

The invention will be understood by the following description of an embodiment, by way of example, in conjunction with the accompanying drawings, in which.

Figure 1:
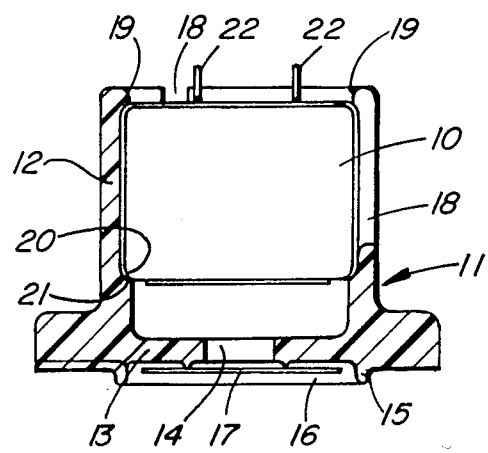
FIG. 1 is a cross-section through an assembled cartridge microphone and adaptor.

As illustrated in FIG. 1, a cartridge microphone, indicated at 10, is mounted in a hollow adaptor 11. The adaptor comprises a tubular housing part 12 with a front flange 13 which extends across one end of the tubular housing. A small hole 14 is provided in the flange 13. An annular rib 15 on the front face of the flange 13 defines a shallow recess 16 and a disc of acoustic resistance material 17 is fastened, as by welding or bonding, to the front face of the flange within the rib 15. The tubular housing has three slots 18 extending from the open back face of the adaptor. A shallow rib 19 extends inwards at the back edge of the housing. The cartridge microphone is pushed into the housing deforming the wall outwards slightly as the cartridge is pushed past the rib 19, which then snaps in behind the cartridge. The front peripheral cover 20 of the cartridge is held firmly against a narrow ledge 21 extending around the inside of the housing. The ledge positions the front face of the cartridge a predetermined distance from the flange 13. Terminals 22 extend from the back surface of the cartridge for connection to the telephone circuitry.

Figure 2:
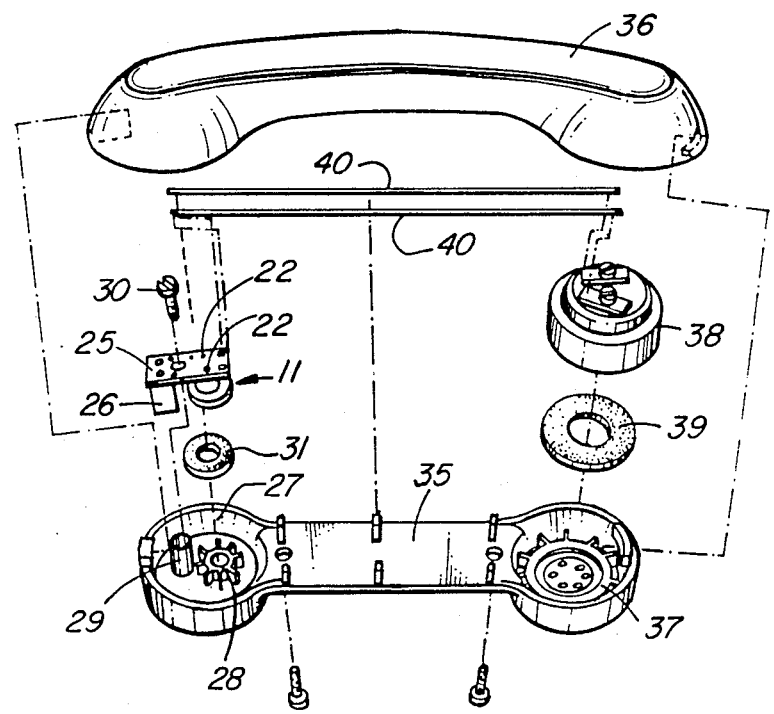
FIG. 2 is an exploded perspective view of a handset with the cartridge microphone transmitter and a receiver.

As illustrated in FIG. 2, the cartridge microphone and adaptor, as in FIG. 1, is mounted on a small circuit board 25, which also carries a modular jack 26. This assembly is mounted in the transmitter housing of the handset, the housing indicated at 27. The adaptor rests on a tubular formation 28 extending up from the inner surface of the front face of the housing 27. The circuit board 25 rests on the pillar 29 and is fastened thereto by a screw 30. An annular seal 31 is positioned between the adaptor 11 and the tubular formation 28. The modular jack 26 is aligned with an aperture in the wall of the housing 27 for reception of a modular plug.

FIG. 2 also illustrates the rest of the handset, which comprises the front and back members 35 and 36, the front member also having a receiver housing 37, the receiver indicated at 38 and a sealing washer at 19. The electrical connections from the receiver to the circuit board 25 is by two wires 40.

Figure 3:
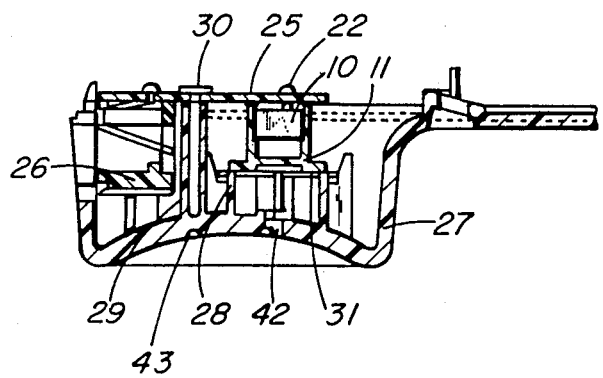
FIG. 3 is a cross-section on the line III—III of FIG. 2 illustrating the assembly of transmitter to the housing of the handset.
Figure 4:
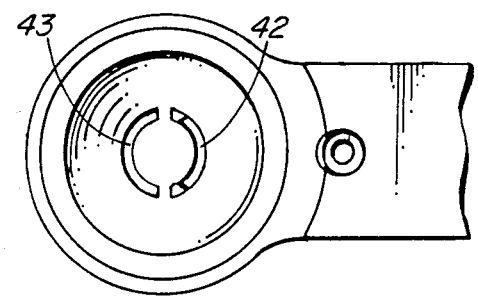
FIG. 4 is a front face view of the transmitter housing.
Figure 5:
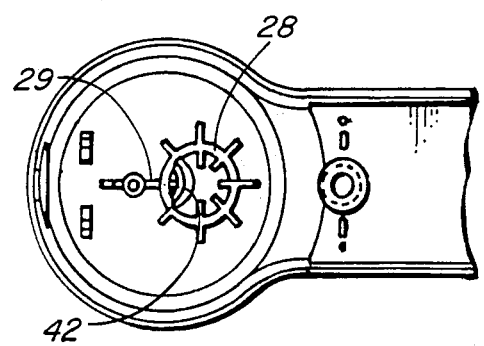
FIG. 5 is a view on the interior surface of the transmitter housing with the transmitter assembly omitted.

The assembly of the microphone 10, adaptor 11, circuit board 25 and jack 26 is seen in cross-section in FIG. 3. In the front face 41 of the transmitter housing 27, there is formed an arcuate slot 42. The slot is within the formation 28 and is wider at its rearward part, as seen in FIG. 3. For aesthetic reasons a groove 43 is formed in the front surface of the front face, continuing the narrower part of slot 42. However this groove does not extend through the front face. The groove 43 and slot 42 can be seen also in FIG. 4 and the slot 42 is seen in FIG. 5.

The cartridge microphone, as stated, does not have, of itself, a satisfactory response curve, and does not meet telephone standards. The response is modified by the mounting of the microphone. Thus firstly the cartridge is mounted in the adaptor with a particular volume between the face of the cartridge and the end of the adaptor. In the end of the adaptor is a small hole 14, covered with the acoustic material 17. The volume between the cartridge and the acoustic resistance is such as to provide the required damping. The acoustic resistance, from the acoustic material 27, is chosen to limit the peak to 14 dB rise from 1000 Hz. The size of the hole 14 is related to the acoustic resistance of the material 17. The volume between the base of the adaptor and the front face of the housing 27 and the slot 42 cooperate to produce a resonance at 3000 Hz. This latter volume, referred to as the front volume, is sealed at the interface between adaptor 11 and the tubular formation 28 by the seal 31.

Figure 6:
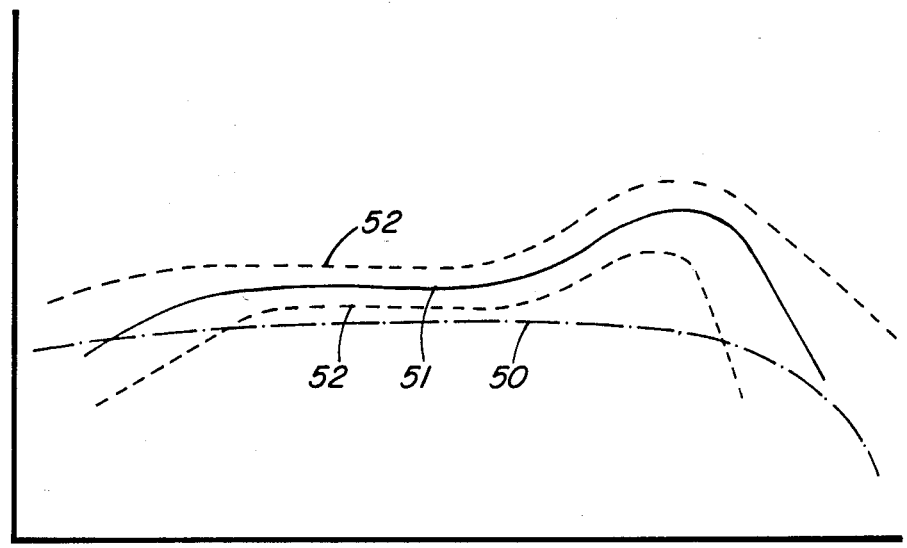
FIG. 6 illustrates the performance curve desired for a telephone transmitter, and also the curve normally obtained with the cartridge microphone.

FIG. 6 illustrates the modified response curve obtained by the invention relative to an unmodified transducer. The chain dotted line 50 illustrates an unmodified transducer response curve and full line 51 illustrates the ideal or mean curve obtained with the invention. The dotted lines 52 illustrate a tolerance envelope acceptable for the curve 51.

We claim:

1. A transmitter assembly for a telephone handset, comprising:
- a tubular transmitter housing having a front face, a back end, and a peripherally extending wall between said front face and said back end;
- a tubular formation on an inner surface of said front face, integral with said front face, said tubular formation having an end surface spaced from said front face;
- a transmitter assembly in said tubular transmitter housing, said transmitter assembly comprising a cartridge electret microphone and a tubular adaptor enclosing said microphone; said adaptor having a peripheral wall defining a cylindrical bore, an annular projection extending around said bore a predetermined distance from a front end of said bore; resiliently deformable means extending into said bore, said microphone being a snap insertion past said resiliently deformable means and being held between said resiliently deformable means and said annular projection; an end wall on said adaptor extending across said front end of said bore and defining a first volume between said microphone and said end wall; a hole extending through said end wall coaxial with said bore and a layer of accoustic material on said end wall on a surface remote from said first volume, said layer of accoustic material extending over said hole; said end wall positioned on said end surface of said tubular formation, said tubular formation defining a second volume between said inner surface of said front face and said end wall of said adaptor; and an aperture in said front face of said transmitter housing.

2. An assembly as claimed in claim 1, including a plurality of axially extending slots in said peripheral wall of said adaptor, said slots extending from said back end part way to said front face, and a shallow rib extending inward on said peripheral wall of said adaptor at said back end, said rib and said peripheral wall of said adaptor between said slots forming said resiliently deformable means.

3. An assembly as claimed in claim 1, said aperture in said front face comprising a slot.

4. An assembly as claimed in claim 3, said first volume of a predetermined value to provide predetermined damping, said accoustic resistance of a value to limit peak output from the microphone to a 14 dB rise at 1000 Hz, and the second volume of a predetermined value to produce, in combination with said slot, a resonance at 3000 Hz.

5. An assembly as claimed in claim 1, including an annular rib extending from a front surface of said end wall extending across said front end of said bore, said annular rib coaxial with said bore, said layer of accoustic resistance material being attached to said front surface within said annular rib.

* * * * *